(12) United States Patent
Richardson

(10) Patent No.: US 8,035,644 B2
(45) Date of Patent: *Oct. 11, 2011

(54) METHOD FOR EMBEDDING ANIMATION IN ELECTRONIC MAIL AND WEBSITES

(76) Inventor: Douglas G. Richardson, Dripping Springs, TX (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/140,060

(22) Filed: Jun. 16, 2008

(65) Prior Publication Data
US 2008/0259167 A1 Oct. 23, 2008

Related U.S. Application Data

(63) Continuation-in-part of application No. 11/586,016, filed on Oct. 25, 2006, now Pat. No. 7,388,587, which is a continuation-in-part of application No. 11/403,374, filed on Apr. 12, 2006, now Pat. No. 7,629,977.

(60) Provisional application No. 60/670,402, filed on Apr. 12, 2005.

(51) Int. Cl.
*G06T 13/00* (2006.01)

(52) U.S. Cl. ........ 345/474; 345/473; 345/475; 345/629; 348/42; 348/239; 348/586; 348/597

(58) Field of Classification Search .................... 348/42, 348/207.99, 239, 586, 597; 345/629, 473–475
See application file for complete search history.

(56) References Cited

U.S. PATENT DOCUMENTS 7,388,587 B1 * 6/2008 Richardson .................... 345/474
7,629,977 B1 * 12/2009 Richardson .................... 345/473

* cited by examiner

*Primary Examiner* — David Ometz
*Assistant Examiner* — Antoinette Spinks
(74) *Attorney, Agent, or Firm* — Gregory K. Goshorn; Greg Goshorn, P.C.

(57) ABSTRACT

Provided is a method for providing animation in electronic communications. An image is generated by capturing multiple photographs from a camera or video camera typically fixed in one position. The first photograph is called the "naked photo." Using a graphics program, photos subsequent to the naked photo are edited to cut an element common to the subsequent photos. The cut images are pasted into the naked photo as layers. The modified naked photo, including the layers, is stored as a web-enabled graphics file, which is then transmitted in conjunction with electronic communication. When the electronic communication is received, the naked photo is displayed and each of the layers is displayed and removed in the order that each was taken with a short delay between photos. In this manner, a movie is generated with much smaller files than is currently possible.

21 Claims, 7 Drawing Sheets

METHOD FOR EMBEDDING ANIMATION IN ELECTRONIC MAIL AND WEBSITES

CROSS-REFERENCE TO RELATED APPLICATIONS

The present application is a Continuation-in-Part and claims the benefit of the filing date of the following U.S. patent with a common inventor:

U.S. Pat. No. 7,388,587, filed Nov. 25, 2006, entitled "Method for Embedding Animation in Electronic Mail and Websites;"

which is a Continuation-in-Part and claims the benefit of the filing date of the following application with a common inventor:

U.S. patent application Ser. No. 11/403,374, filed Apr. 12, 2006, entitled "Method for Embedding Animation in Electronic Mail and Websites;"

which is related to and claims the claims the benefit of the filing date of the following provisional application with a common inventor, which is hereby incorporated by reference:

U.S. Provisional Patent Application Ser. No. 60/670,402, filed Apr. 12, 2005, titled "Email/Electronic Mail Embedded With Animation."

TECHNICAL FIELD

The present invention relates generally to electronic mail and websites and, more specifically, to a method for embedding images in email and websites.

BACKGROUND OF THE INVENTION

For the past couple of decades, the amount of electronic communication has grown exponentially every year. Information content associated with the Internet, or websites, now number in the millions and, as the Internet has become increasingly accessible to millions of people, the number of email messages exchanged has also increased. Websites and email are now a common medium for the communication of both personal and business information.

People who market products or services over electronic communication channels often desire to include graphics into their presentations. Although graphics are very effective at capturing the attention of the person receiving the communication, they also require large files that must be stored and transmitted. Over a slow connection, a large file typically takes a proportionally longer time to transmit than a small file. If the transmission time is too long the person receiving the transmission may choose to abort the message.

Currently, there are several methods for avoiding long transmission times associated with the sending of graphic information. One method is to send static pictures, i.e. pictures that do not change. However, multiple images composed into "movies" or "tanimations" are better at attracting a recipient's attention. Of course, multiple images take considerably longer to transmit than a single image.

Movies are typically transmitted as a series of frames, with each frame a picture of the entire shot at successive intervals of time. Of course, each picture in a succession of shots takes time to download. Another method for generating movies in electronic communication is the use of flash graphics, or flash. Flash images include an image file and programming code to animate the file. In other words, rather than sending multiple images to achieve a movie affect, flash transmits one image and computer instructions on how to manipulate the image. The computer that receives the flash content then displays the image and executes the instructions to display a dynamic image. Although, this method saves transmission bandwidth, the programming of the instructions is difficult and the results are limited to that which can be expressed in the transmitted code. In addition, the receiving computer must include a specific program, or plug-in, for executing the flash code.

Increasingly, electronic communication is performed over wireless communication channels. On wireless communication channels, the amount of information able to be transmitted in a short period of time is even more limited than on wired connections.

What is needed is an efficient method for transmitting dynamic images over wireless, and wired, connections using a minimum of bandwidth. In other words, a new method should be able to transmit dynamic images in small files such as email messages so that download times are minimized. What is also needed is a method for electronically transmitting dynamic images, which is simpler in construction, more universally usable and more versatile than current methods.

SUMMARY OF THE INVENTION

Provided is a method for embedding animation in electronic communications that is not apparent, obvious or suggested either directly or indirectly by the prior art. The claimed subject matter provides an efficient method for transmitting dynamic images, or "movies," over both wired and wireless electronic communication media.

An image is generated by capturing multiple photographs from a camera or video camera, typically fixed at one position and focal length or held by hand with slight motion of the camera while filming. The first photograph is called the "naked photo." Using a graphics program such as, but not limited to, Adobe Photoshop, published by Adobe Systems Incorporated of San Jose, Calif., photos subsequent to the naked photo are edited to select an element that is in motion. Typically, the moving element is not included in the naked photo but may be. For example, the subsequent photos, but not the naked photo, may include an automobile that is moving across the field of vision. If subsequent action is limited to a particular area of the photo, the object performing the action may be included in the naked photo without distracting from the desired effects. Subsequent photos are edited to save the moving vehicle and, if necessary, a small area around the moving vehicle. In addition, depending upon a defined sensitivity level, other moving portions of the photos are edited. The edited images are stored in conjunction with the naked photos as layers in a graphic file that is then web-enabled, with each layer placed in a position corresponding to the clipped image's location in the corresponding subsequent photo.

The modified naked photo is then transmitted in conjunction with a web-enabled electronic communication such as an email or website. When received, i.e. the email is opened or the website is downloaded, the naked photo is displayed. Each of the subsequent added layers is then displayed and removed in the order that each was pasted into the naked photo. The layers are displayed in the naked photo with a short delay in between and at a location corresponding to the location from which the layer was clipped from each photo or the entire photo/video clip. In this manner, a movie is generated with much smaller files than is currently possible in the prior art.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures, in which.

DETAILED DESCRIPTION OF THE FIGURES

Although described with particular reference to electronic email and websites, the claimed subject matter can be implemented in any information technology (IT) system in which the efficient transmission of dynamic images is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for the transmission of dynamic images. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
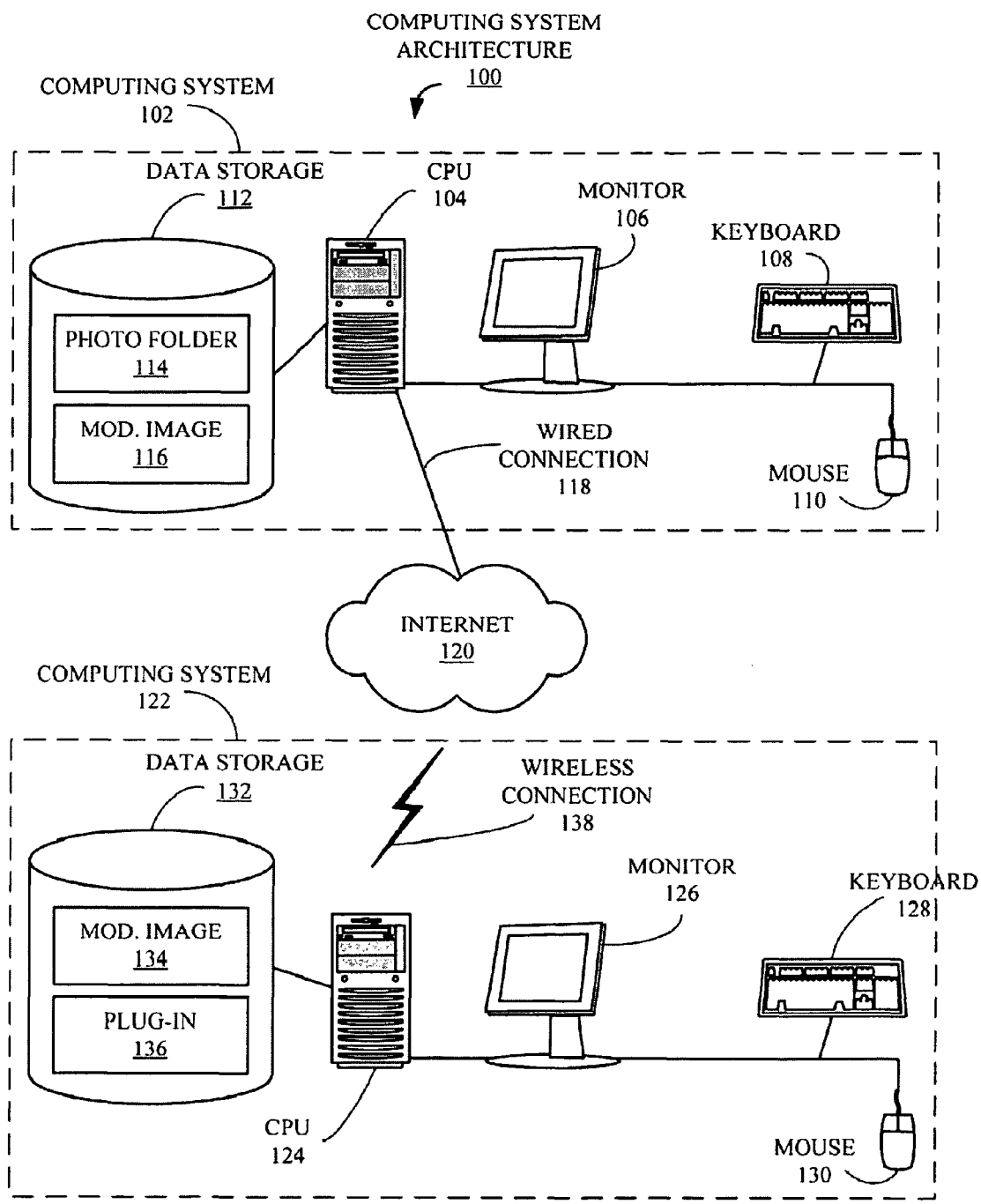
FIG. 1 is a block diagram of an exemplary computing system architecture that supports the claimed subject matter.

Turning now to the figures, FIG. 1 is a block diagram of an exemplary computing system architecture 100 that supports the claimed subject matter. It should be noted there are many possible computing system architecture configurations, of which computing system architecture 100 is only one simple example.

A computing system, or computer, 102 includes a central processing unit (CPU) 104, coupled to a monitor 106, a keyboard 108 and a mouse 110, which together facilitate human interaction with computer 102. Also included in computer 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown).

Figure 2:
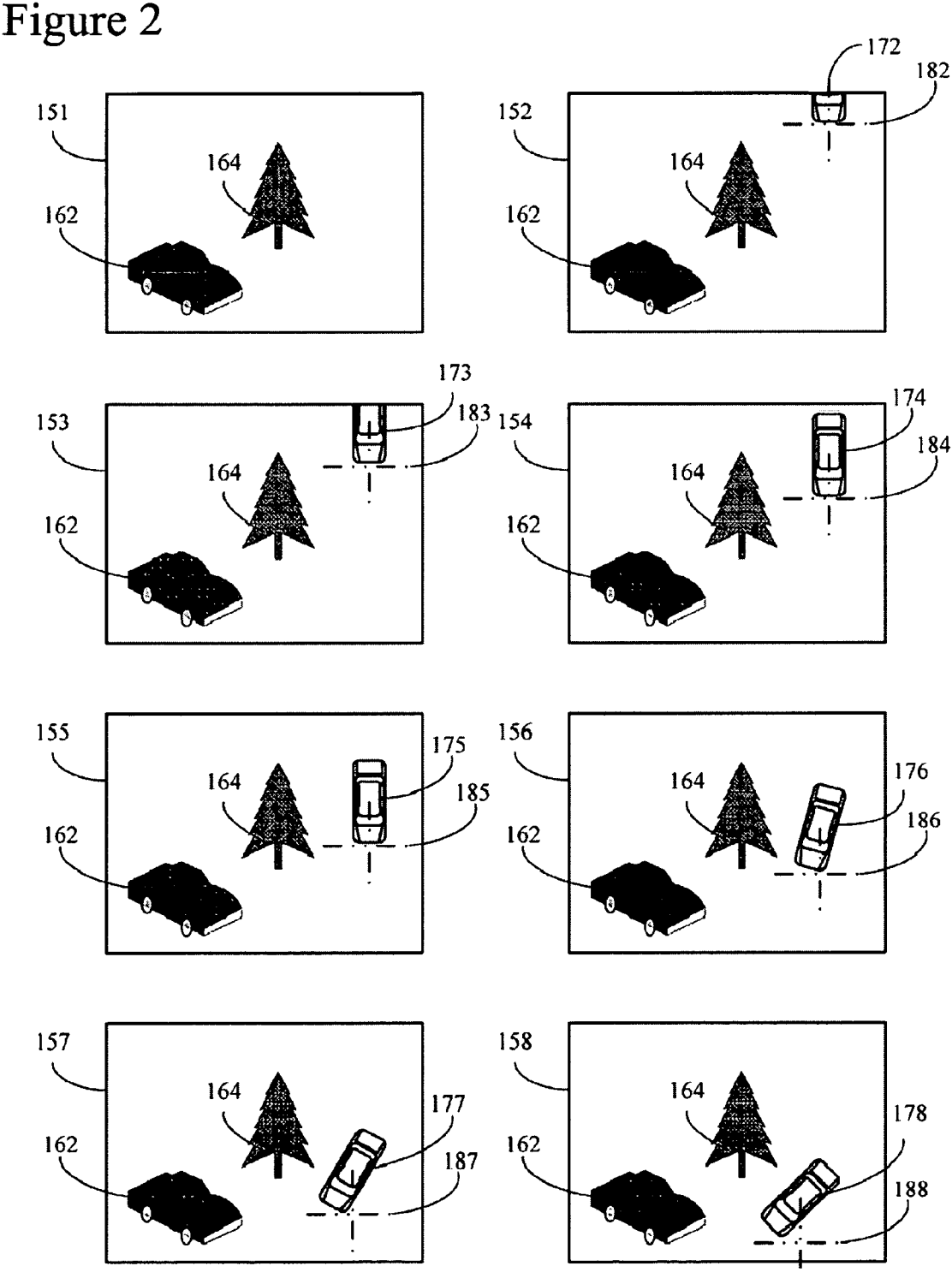
FIG. 2 is an illustration of eight photographs of a particular scene, captured one after the other with a short time delay.
Figure 3:
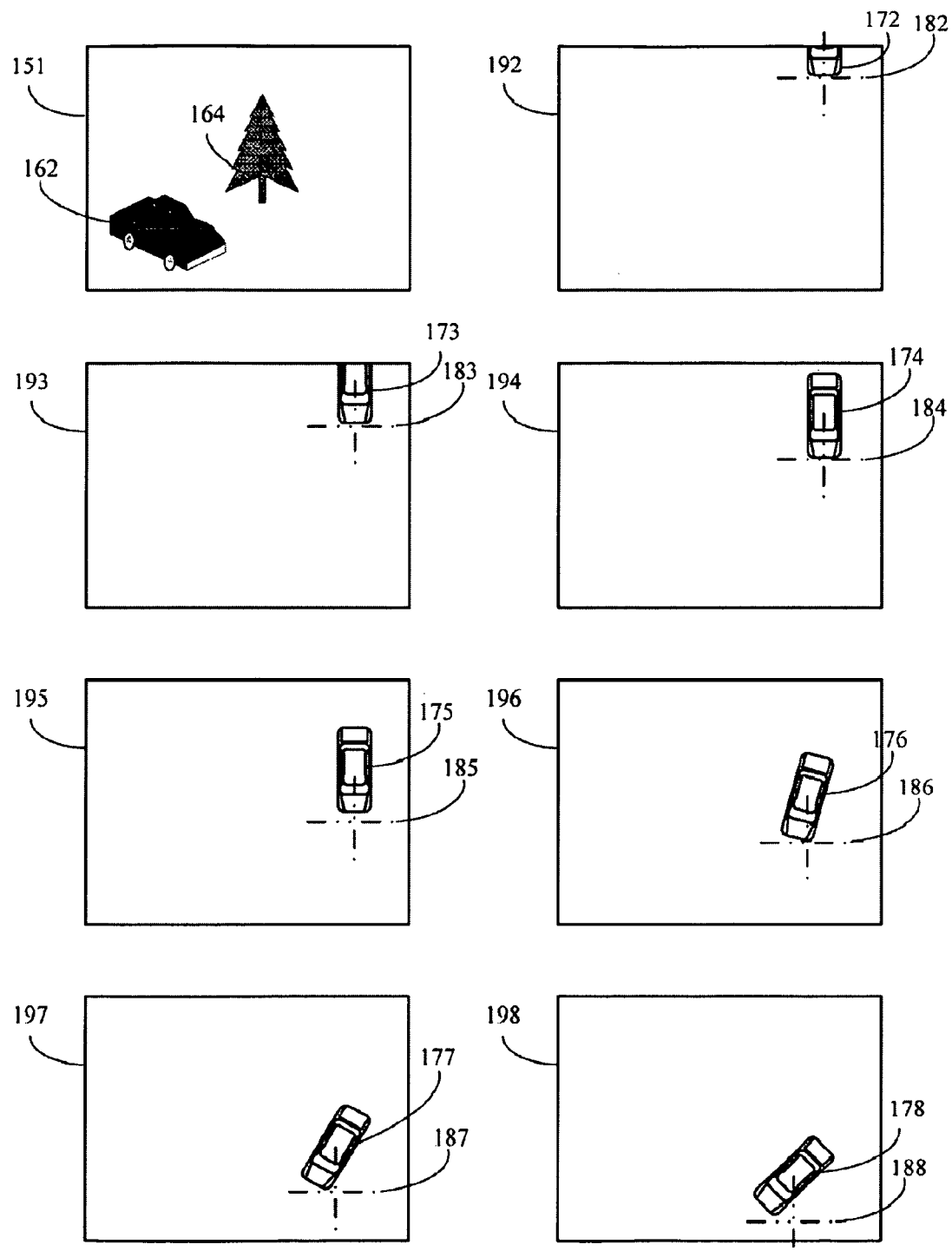
FIG. 3 is an illustration of the eight photographs of FIG. 2 after modification in accordance with one implementation of the claimed subject matter.

Data storage 112 is illustrated storing an exemplary photography file, or photo folder, 114. Photo folder 114, which includes captured images 151-158 (see FIG. 2), is employed in one exemplary implementation of the claimed subject, explained below in conjunction with FIGS. 2-6. A modified (mod.) image file 116, which may store multiple images, is stored on data storage 112. Mod. image file 116 stores a digital image or images, composed of other images such as image 151 and portions of images 192-198 (see FIG. 3). Mod. Image file 116 is created and organized according to an Animation Setup process 300 described in more detail below in conjunction with FIG. 5. In an alternative embodiment, rather than one image file 116, there are multiple files. In other words rather than a single image file 116, there is modified image file 116, which is a high resolution graphic format such as, but not limited to, a joint photographic experts group (jpg) format that holds a naked image (see element 151, FIGS. 2 and 3) and there is another file of lower resolution graphic format, such as but not limited to a graphics interchange format (gif) format, that stores multiple images that are portions of images 192-198, employed to add animation to the naked image (see elements 172-178. FIGS. 2 and 3) stored in image file 116 as described below.

Computer 102 is connected to the Internet 120 via a wired connection 118. Although in this example, computer 102 is communicatively coupled to the Internet 120 via wired connection 118, it could also be coupled through any number of communication mediums such as, but not limited to, a local area network (LAN) (not shown) and a wireless connection.

Also attached to Internet 120 is a second computing system, or computer, 122, which like computer 102 includes a CPU 124, a monitor 126, a keyboard 128, a mouse 130 and data storage 132. Data storage 132 is illustrated storing an exemplary modified (mod.) image file 134 and an executable module, or plug-in, 136. Modified image 134 is a copy of modified image 116, which has been transmitted from computer 102 to computer 122. The transmission of file 116 may be in conjunction with, for example but not limited to, an email message or the downloading of a web page. Plug-in module 136 is a piece of computer logic that might execute typical animations. In contrast, the claimed subject matter, as illustrated in a Display Animation process 330, described below in conjunction with FIG. 6, does not need plug-in module 136 to execute.

Computer 122 is coupled to the Internet 120 via a wireless connection 138. Although in this example, computer 122 is communicatively coupled to the Internet 120 via wireless connection 138, it could also be coupled through any number of communication mediums such as, but not limited to, a local area network (LAN) (not shown) and a wired connection such as connection 118. Connections 118 and 138 via Internet 120 enable computer 102 and computer 122 to communicate. In the following example, the claimed subject matter is described with respect to an electronic mail message, or email, (not shown) or a web page (not shown) transmitted from computer 102 to computer 122 via Internet 120.

FIG. 2 is an illustration of eight photographs, or images, 151-158 of a particular scene, captured one after the other with a short time delay. Examples of equipment for taking photographs 151-158 include, but are not limited to, a video camera, a 35 mm camera, and a medium or large format digital or film camera. Photographs also may include inserted graphic enhancements and/or text. Images 151-158 are for example only and are used in conjunction with FIGS. 5-7 to describe the claimed subject matter. In this example, images 151-158 are stored in photo folder 114 (FIG. 1) of data storage 112 (FIG. 1).

A first image 151 includes two exemplary elements, an automobile 162 and a tree 164. A second image 152 is captured a short time after first image 151 and also includes automobile 162 and tree 164. Image 152 also includes a partial shot of a second automobile 172 that is in motion and beginning to enter frame 152. Automobile 172 is illustrated at a position 182 within image 152. Although displayed from different perspectives and at different locations within images 152-158, the second automobile is referred to throughout the Specification as automobile 172. It should be noted that automobile 172 is only one example of the type of image that may be animated according to the claimed subject matter. Another example includes, but is not limited to, text images.

In a similar fashion, each of third, fourth, fifth, sixth, seventh and eighth images 153-158 include exemplary automobile 162 and tree 164. Each of images 153-158 also shows images of automobile 172 from slightly different perspectives 173-178 and positions 183-188, respectively, within frames 153-158. Different positions 183-188 result from a short delay in time between the capture of images 152-158 such that automobile 172, which is in motion, has changed perspective and moved between capture of images 152-158.

FIG. 3 is an illustration of eight images, specifically image 151 (FIG. 2) and images 192-198. Image 151 is the same as image 151 of FIG. 2, including automobile 162 (FIG. 2) and tree 164 (FIG. 2). Images 192-198 correspond to images 152-158 of FIG. 2 after modification in accordance with the claimed subject matter. The modification of images 152-158 to produce images 192-198 is described in more detail below in conjunction with FIG. 5. The use of images 151 and 192-198 to produce an animation, or "movie," in accordance with the claimed subject matter is explained in detail below in conjunction with FIG. 6. Those with skill in the animation and computing arts should understand how multiple images are composed to create an animation or movie in which movement of elements is created. In this example, images 151 and 192-198 are stored in modified image file 116 (FIG. 1) of data storage 112 (FIG. 1).

As mentioned above, image 151 is the first image captured in the series of images 151-158 and is referred to as the "naked image." Images 192-198 include frames the size of naked image 151 and a selected element, which in this example is automobile 172 (FIG. 2) from images 152-158. Clipped portions of images 152-158 that include different perspectives 172-178 of second automobile 172 are positioned in the corresponding frames 192-198 in the same position 182-188 (FIG. 2) as in the corresponding images 152-158. In this example, the entire frames 192-198 and the selected elements 172-178, representing the second automobile 172 are stored as layers in modified image 116. The entire frames 192-198, with the exception of elements 172-178 are transparent so that, as layers of image 151, the features of frame 151, such as automobile 162 and tree 164 are displayed without the need to retransmit the corresponding information with each frame 192-198. In alternative embodiment, only elements 172-178 and corresponding positions 182-188 are stored and/or may be stored at in a lower resolution format.

Figure 4:
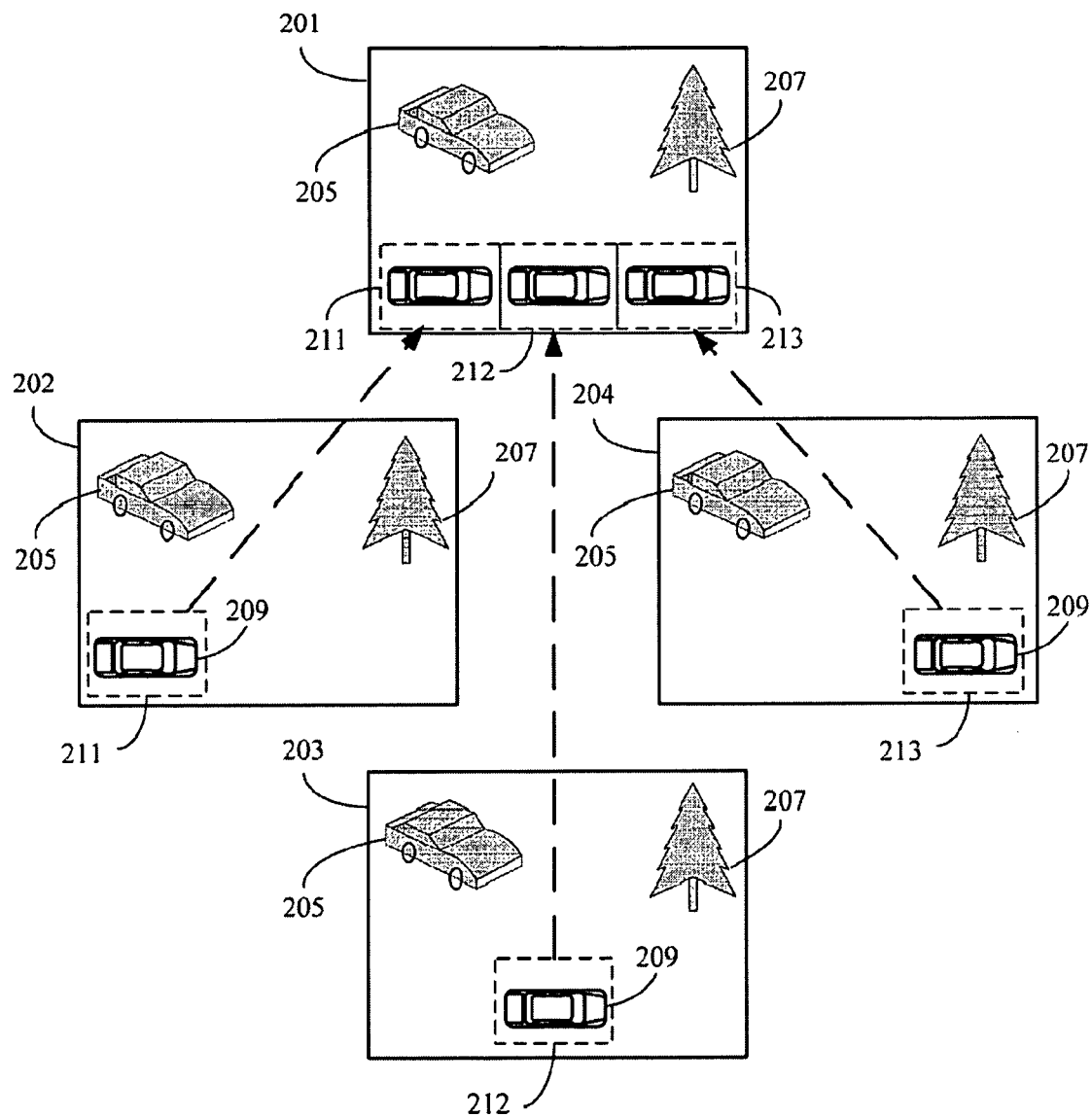
FIG. 4 is an illustration of four photographs showing a portion of some of the photographs superimposed upon the first photograph in accordance with a second implementation of the claimed subject matter.

FIG. 4 is an illustration of four photographs, or images, 201-204, taken sequentially, each of which include an automobile 205 and a tree 207. Photographs 202-203 include a picture of a second automobile 209. When photograph 201 is captured, second automobile 209 is not in photograph 201. As described in more detail below in conjunction with FIG. 5, a portion 211 of image 202, which includes automobile 209, is cut and pasted into image 201 as a layer superimposed upon image 201. A portion 212 and a portion 213 of images 203 and 204, also including automobile 209, respectively, are also cut and pasted into image 201 as two additional and separate layers. It should be noted that to create the appearance of movement of automobile 209 within modified image 201, typically more than three (3) photographs, with the selected elements overlapping, are taken. For the sake of simplicity, only three (3) images are shown.

Figure 5:
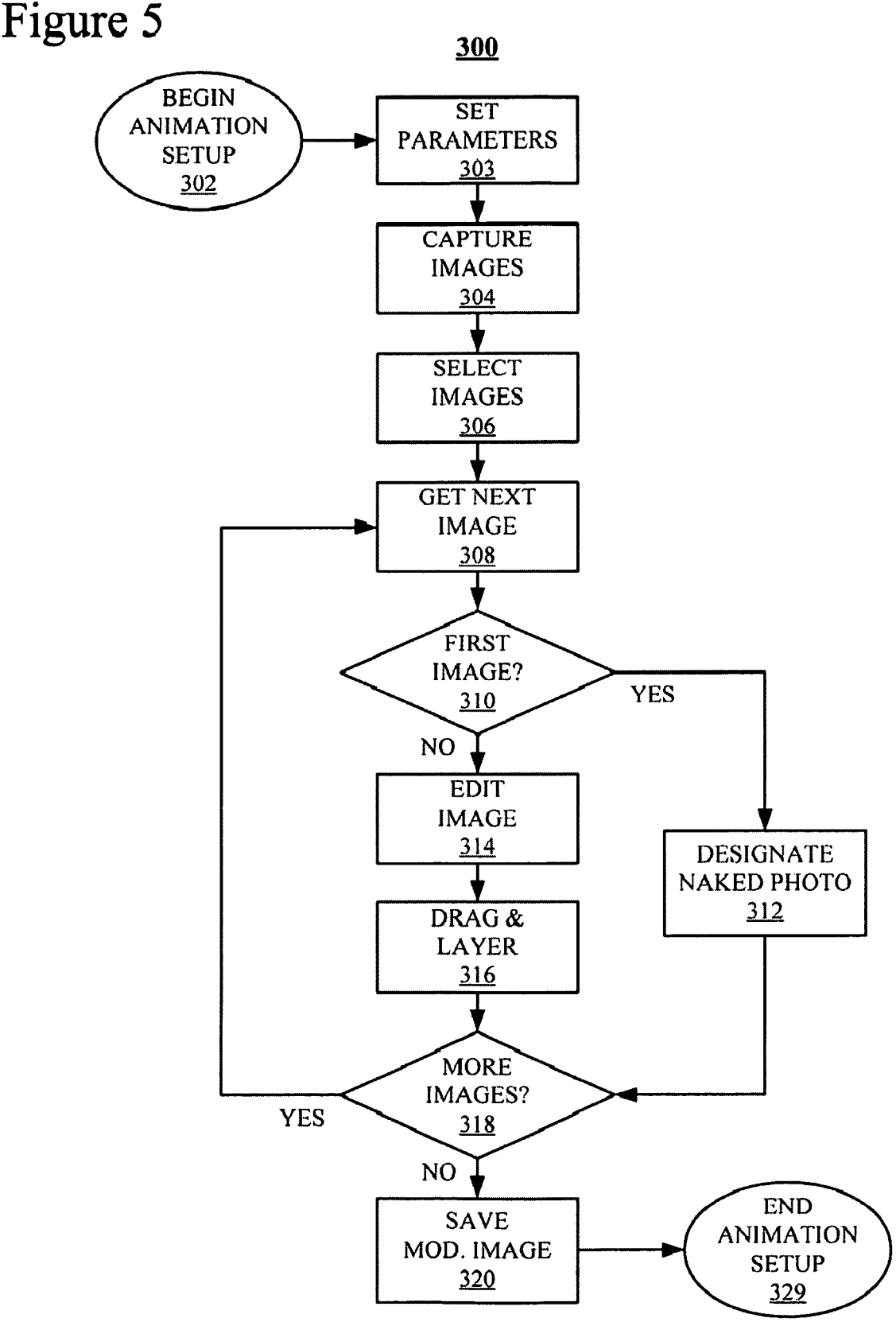
FIG. 5 is a flowchart of an exemplary Animation Setup process that implements the claimed subject matter.

FIG. 5 is a flowchart of an exemplary Animation Setup 300 process that creates one implementation of the claimed subject matter. In this example, process 301 is executed on CPU 104 (FIG. 1) by a user using devices 106, 108 and 110 (FIG. 1) of computer 102 (FIG. 1). Throughout the description of process 300 and a Display Animation process 330, described below in conjunction with FIG. 6, both captured images 151-158 (FIG. 2) and modified images 192-198 (FIG. 3) represent a scene of automobile 172 (FIGS. 2 and 3) driving across the field of view and stopping in the forefront of the resulting frame. Processes 300 and 330 are described in relation to images 151-158 and images 192-198. In addition, when appropriate for the understanding of an alternative embodiment, process 300 is described in relation to images 201-204 and frames 211-213 of FIG. 4. These particular scenes are used only as examples and it should be understood that the claimed subject matter is equally applicable to many different types of images in which movement of a specific element or elements, the "target" element(s), is desired. Further, more than one element may be targeted and implemented within a single animation or movie.

Process 300 starts in a "Begin Animation Setup" block 302 and proceeds immediately to a "Set Parameters" block 303. During block 303, process 300 incorporates various setup parameters that control image processing. One example of a setup parameter is a value that adjusts the sensitivity of the processing of photos. For example, at a low sensitivity setting, only large blocks of pixels that change from frame to frame, such as the pixels corresponding to automobile 172 (FIGS. 3 and 4), are included in the image processing for inclusion in a finished product. At a high sensitivity setting, blocks of pixels of small objects, such as leaves (not shown)

on tree 164 (FIGS. 3 and 4), are processed as well. The sensitivity level includes, but is not limited to, parameters for specifying both the size of pixel blocks that are compared, i.e. the granularity, the degree of difference in compared pixel blocks that are considered significant and a calculation of a degree of movement corresponding to an unidentified portion. Those with skill in the computing and graphics arts should be familiar with techniques for implementing this aspect of the claimed subject matter.

During a "Capture Images" block 304. During block 304, a camera or video camera is employed to take a number of pictures or images. In the following example, the camera or video camera captures images 151-158, which together capture movement of automobile 172 at successive points in travel through the scene. In the alternative, images 211-204 are captured. Unless the embodiment associated with images 201-204 differs from the embodiment associated with FIGS. 3 and 4, the following example employs images 151-158.

Any number of images may be captured, but typically the number is between two (2) and five hundred (500) with a delay between images of 0.01 to 1.0 seconds. During a "Select Images" block 306, particular images of images 151-158, captured during block 304, are selected for further processing. Although in the following example all of images 151-158 are selected, a subset of the total number of images may be selected for further processing, e.g. every second or third image.

During a "Get Next Image" block 308, process 300 retrieves from photo folder 114 (FIG. 1) of data storage 112 (FIG. 1) the first unprocessed image 151-158, based upon chronological order. During a "First Image?" block 310, process 300 determines whether or not the image retrieved during block 308 is the first image in the sequence of images 151-158. In this example, during the first iteration through block 308, the retrieved image is image 151, which does happen to be the first image. In that case, process 300 proceeds to a "Designate Naked Photo" block 312 during which image 151 is designated as the "Naked Photo" and stored in modified image file 116 (FIG. 1) of data storage 112.

In one embodiment, image file 116 is a high resolution graphic file, such as but not limited to, a jpg file and subsequent images are stored in a different lower resolution format file (not shown).

If the image retrieved during block 308 is not the first image in the series of images 151-158, process 300 proceeds to an "Edit Image" block 314. During block 314, process 300 as directed by the user, selects an element of the image retrieved during block 308, e.g. image 152. In this example, the targeted element is automobile 172 and the portion of image 152 associated with automobile 172 is clipped from image 151. In an alternative embodiment associated with FIG. 4, the image retrieved during block 208 is image 202 and the target element is automobile 209. Element 209 and an area adjacent to element 209 as small as possible are clipped from image 202. Block 314 is describes in more detail below in conjunction with FIG. 7.

During a "Drag & Layer" block 316, process 300 places the image clipped during block 314 into frame 192 (FIG. 3), which is the same size as naked photo 151. Automobile 172 is also positioned within frame 192 in a position corresponding to the position of automobile 172 in corresponding image 152, which in this iteration is position 182 (FIGS. 2 and 3). Then, process 300 stores modified image 192 in modified images file 116 as a layer of naked picture 151. In the alternative embodiment associated with FIG. 4, a clipped image 211 with the targeted element is stored as a layer of naked photo 201 in a position corresponding to the location of element 211 in corresponding captured image 202, rather than storing the clipped image with a frame. In another embodiment, the clipped image is stored in conjunction with coordinates corresponding to the location of the image from which the image was clipped, rather than in a frame. In addition, clipped images may be stored at a lower resolution than the naked image. The layer is then stored in naked image 151 at a position corresponding to the stored coordinates or stored in the lower format in a different file, along with the corresponding coordinates.

During a "More Images?" block 318, process 300 determines whether or not there are additional unprocessed images in image file 114. If so, process 300 returns to Get Next Image block 308 and processing continues as described above. If not, process 300 proceeds to a "Save Mod. Image" block 320 during which the naked photo, along with the layers generated during iterations through blocks 308, 310, 314, 316 and 318, are stored as mod. image file 116 in a web-compatible graphic format such as, but not limited to, a graphic interchange format (gif) and/or a joint photographic experts group (jpg) format. The file is saved without the extension portion of the file name. For example, if the file is a .gif file entitled "image.gif," image 116 is saved to memory as a file entitled simply "image." This technique prevents users who receive the image as part of an electronic communication from saving is as anything other than a web browser type of file such as, but not limited to, a file with a .bmp extension. When the image is received as part of an electronic communication, a web browser application automatically knows how to display the image to reveal the claimed subject matter but, when a user attempts to save the image, the web browser typically only offers to save as a file that captures a snapshot rather than the animated aspects of the image. In other words, the web browser save option captures a snapshot of image 116 at a particular point in time but does not preserve the disclosed animation qualities of the image.

The graphic file is then embedded in a web-based format, such as but not limited to, hypertext markup language (html) file, to make the file web-enabled. Those with skill in the computing arts should be familiar with various graphic and web-enabling formats for images such as gif, jpeg and html. Finally, process 300 proceeds to an "End Animation Setup" block 319 in which process 300 is complete.

Figure 6:
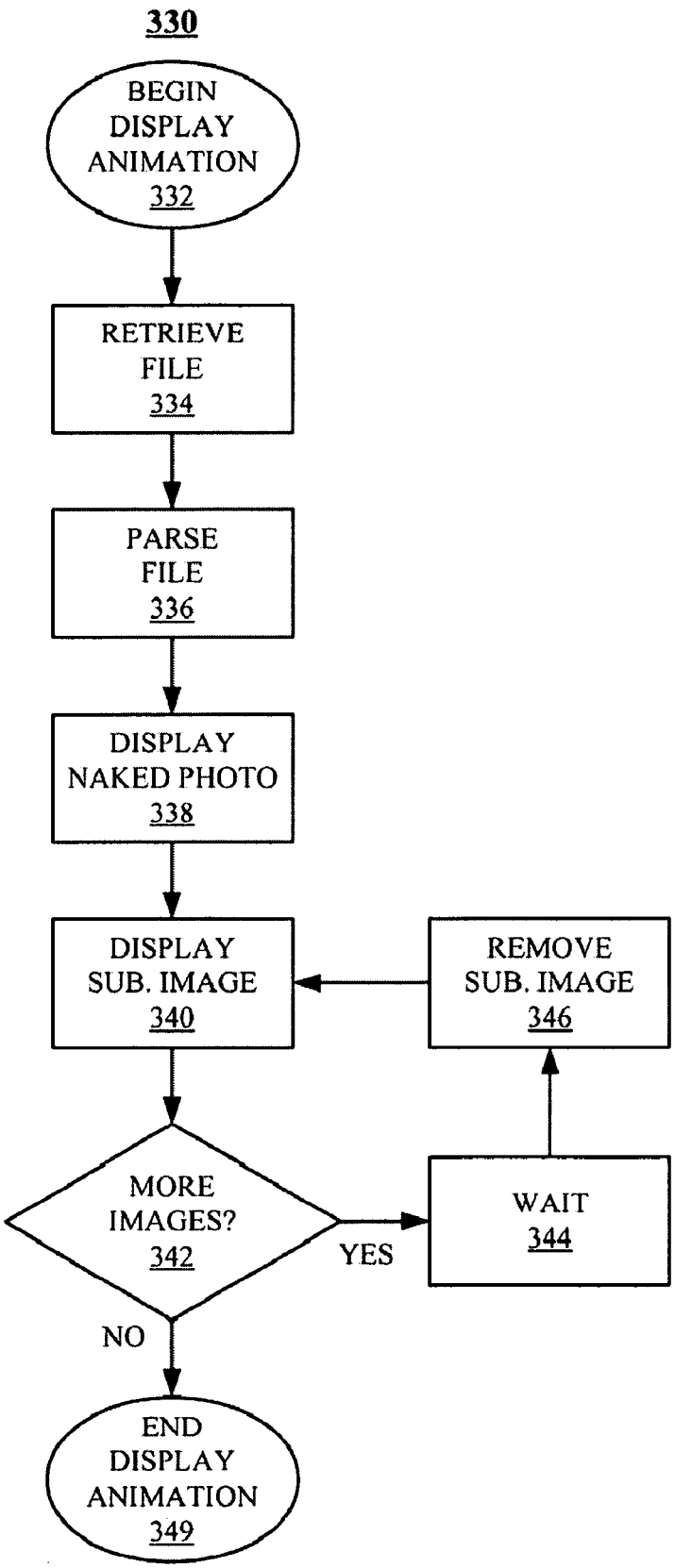
FIG. 6 is a flowchart of an exemplary Display Animation process that implements the claimed subject matter.

FIG. 6 is a flowchart of an exemplary Display Animation process 330 that implements the claimed subject matter. In this example, process 330 is executed on CPU 124 (FIG. 1) of computing system 122 (FIG. 1). Process 330 starts in a "Begin Display Animation" block 332 and proceeds immediately to a "Retrieve File" block 334. During block 334, process 330 retrieves modified image file 134 (FIG. 1). As mentioned above in conjunction with FIG. 1, modified image 134 is a copy of modified images 116 (FIG. 1), which have been transmitted from computer 102 (FIG. 1) to computer 122. The transmission of file 116 may be in conjunction with, for example but not limited to, an email message or the downloading of a web page. In another embodiment, multiple files rather than one file are retrieved, with one file of a higher resolution that the other file or files.

During a "Parse File" block 336, process 330 separates modified image 134 into component parts, or images 151 and frames, or layers, 192-198, for display on monitor 126 (FIG. 1). During a "Display Naked Photo" block 338, process displays naked image 151 on monitor 126. Naked photo 151 may be displayed while layers 192-198 are in the process of being downloaded or parsed. In this manner, a first image can be displayed quickly while processing related to subsequent images is executed. As explained above in conjunction with FIG. 1, in one embodiment, naked image 151 may be stored in a higher resolution format file than file or files employed to store layers 192-198. During a "Display Subsequent (Sub.) Image" block 340, process 330 selects an image of images 192-198 that is the first image in chronological order among the images of images 192-198 that have not yet been processed. The selected image 192-198 is then superimposed upon naked image 151.

During a "More Images?" block 342, process 330 determines whether or not all the images 192-198 have been displayed. If not, process 330) proceeds to a "Wait" block 344 during which a small interval of time is allowed to pass. The amount of elapsed time is typically equivalent to the period of time between two successive image captures performed during Capture Images block 304 (FIG. 5) of process 300 (FIG. 5). This amount of elapsed time enables the resultant animation to appear to unfold in real-time. Of course the animation may be seed up or slowed down by either shortening or lengthening, respectively, the time delay introduced during block 344. During a "Remove Sub. Image" block 346, process 330 removes the image 192-198 displayed during block 340 and process 330 returns to block 340 during which processing continues as described above.

If during block 342 process 330 determines that all of images 192-198 have been displayed, control proceeds to an "End Display Animation" block 349 in which process 330 is complete. It should be noted that following the display of the last of images 192-198 control does not in this example return to block 346, during which the displayed image is removed from naked photo 151, thereby leaving the last photo superimposed naked photo 151 on monitor 126. Of course, process 330 may also be configured to remove the last superimposed image.

Figure 7:
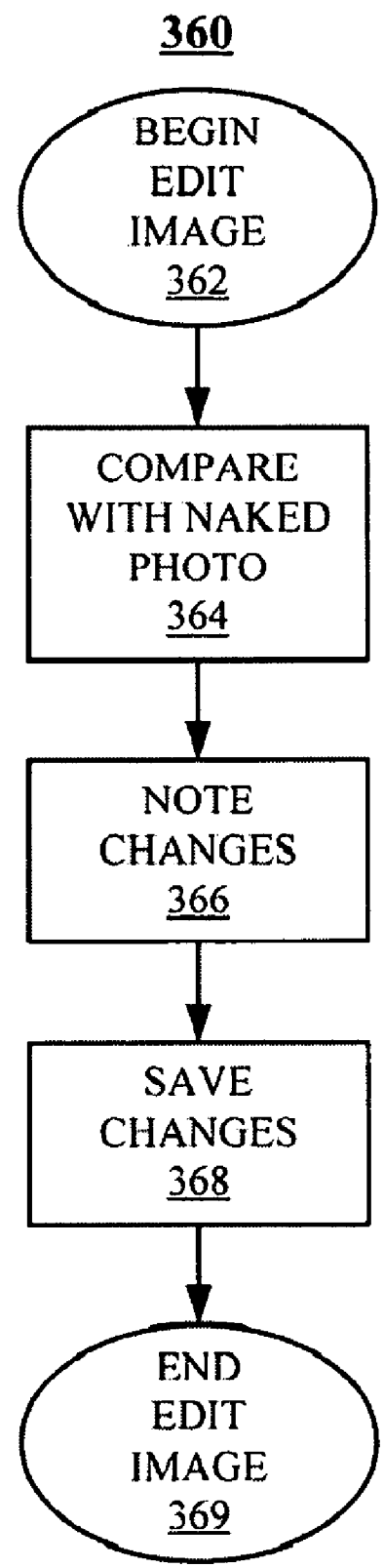
FIG. 7 is a flowchart of an Edit Image block, introduced in FIG. 5, in more detail.

FIG. 7 is a flowchart of an Edit Image process 360, corresponding to Edit Image block 214, first introduced above in conjunction with FIG. 5. Process 360 starts in a "Begin "Edit Image" block 362 and proceeds immediately to a "Compare with Naked Photo" block 364. During block 364, process 360 compares the current image with the naked image captured during Capture Images block 304 (FIG. 5) of Animation Setup process 300 (FIG. 5) and designated as the naked image during Designate Naked Photo block 312 (FIG. 5) of process 300. The comparison is based upon a degree of sensitivity defined during Set Parameters block 303 (FIG. 5) of process 300. For example, as explained above in conjunction with FIG. 5, at a low sensitivity setting, only large blocks of pixels that change from frame to frame, such as the pixels corresponding to automobile 172 (FIGS. 3 and 4), are included in the image processing for inclusion in a finished product. At a high sensitivity setting, blocks of pixels of small objects, such as leaves (not shown) on tree 164 (FIGS. 3 and 4), are processed as well.

During a "Note Changes" block 366, process 300 the differences between the current photo and the naked photo, as determined during block 346, based upon the defined sensitivity level, are noted so that during a "Save Changes" block 368 the changes can be incorporated into a composite image as described above in conjunction with Drag & Layer block 316 (FIG. 5) of process 300. Finally, process 360 proceeds to an "End Edit Image" block 369 in which process 360 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

I claim:

1. A method for providing animation in an electronic message, comprising:
   capturing a first image of a scene from a particular location using a defined set of photographic parameters;
   capturing a plurality of images in a sequential order from the particular location using the defined set of photographic parameters;
   defining a sensitivity level corresponding to pixel blocks of the plurality of images;
   identifying portions of the sequential images that differ from the first image to a degree corresponding to the sensitivity level;
   cutting the identified portions of the sequential images to produce cut images;
   superimposing, the cut images onto the first image as layers such that each cut image is displayed in the first image in a position corresponding to the position of the cut image in the corresponding sequential image and displayed in a time sequence corresponding to the timing between corresponding sequential images and the first image; and
   saving the first image and the layers as a single, web-enabled graphic file.

2. The method of claim 1, wherein the sensitivity level corresponds to a degree of movement of the identified portions.

3. The method of claim 1, further comprising embedding the web-enabled graphic file in an electronic communication.

4. The method of claim 3, wherein the electronic communication is an electronic mail (email) message.

5. The method of claim 3, wherein the electronic communication is a web page.

6. The method of claim 1 further comprising:
   displaying the first image;
   displaying, in an order corresponding to the sequential order, each layer superimposed on the first image, each layer in a position on the first image corresponding to the position of each image in the corresponding sequential image; and
   removing each layer from the first image prior to displaying a next layer in the sequential order.

7. The method of claim 1, wherein the web-enabled graphic file is embedded in a hypertext markup language (HTML) file transmitted in conjunction with an email.

8. An electronic message, comprising:
   a single, web-enabled graphic file stored on a memory, the file comprising:
      a first image of a scene captured from a particular location using a defined set of photographic parameters;
      a plurality of images captured in a sequential order from the particular location using the defined set of photographic parameters;
      identified portions of the sequential images that differ from the first image;
      a plurality of cut images corresponding to the identified portions of the sequential images;
      wherein the cut images are superimposed onto the first image as layers such that each cut image is displayed in the first image in a position corresponding to the position of the cut image in the corresponding sequential image and displayed in a time sequence corresponding to the timing between corresponding sequential images and the first image.

9. The electronic message of claim 8, wherein the web-enabled graphic file corresponds to a file name without a file extension.

10. The electronic message of claim 8, wherein the web-enabled graphic file is embedded in an electronic communication.

11. The electronic message of claim 10, wherein the electronic communication is an electronic mail (email) message.

12. The electronic message of claim 10, wherein the electronic communication is a web page.

13. The electronic message of claim 8 further comprising:
logic, stored on the memory for execution on a processor, for:
displaying the first image;
displaying, in an order corresponding to the sequential order, each layer superimposed on the first image, each layer in a position on the first image corresponding to the position of each image in the corresponding sequential image; and
removing each layer from the first image prior to displaying a next layer in the sequential order.

14. The electronic message of claim 8, wherein the web-enabled graphic file is embedded in a hypertext markup language (HTML) file transmitted in conjunction with an email.

15. A computer programming product for providing animation in an electronic message, comprising:
a memory;
logic, stored on the memory for execution on a processor, for:
defining a sensitivity level corresponding to pixel blocks of the plurality of images;
identifying portions of sequential images that differ from a first image to a degree corresponding to the sensitivity level;
wherein
the first image is an image of a scene captured from a particular location using a defined set of photographic parameters; and
the plurality of images in sequential order are captured from the particular location using the defined set of photographic parameters;
cutting the identified portions of the sequential images to produce cut images;
superimposing, the cut images onto the first image as layers such that each cut image is displayed in the first image in a position corresponding to the position of the cut image in the corresponding sequential image and displayed in a time sequence corresponding to the timing between corresponding sequential images and the first image; and
saving the first image and the layers as a web-enabled graphic file.

16. The computer programming product of claim 15, wherein the sensitivity level corresponds to a degree of movement of an identified portion.

17. The computer programming product of claim 15, wherein the logic for saving of the first image and the layers as a web-enabled graphic file comprises logic for deleting an extension portion of a file name corresponding to the web-enabled graphic file.

18. The computer programming product of claim 15, further comprising logic, stored on the memory, for embedding the web-enabled graphic file in an electronic communication.

19. The computer programming product of claim 18, wherein the electronic communication is an electronic mail (email) message.

20. The computer programming product of claim 18, wherein the electronic communication is a web page.

21. The computer programming product of claim 15, further comprising, logic, stored on the memory, for embedding the web-enabled graphic file in a hypertext markup language (HTML) file for transmission in conjunction with an email.

* * * * *